United States Patent [19]

Benoit, Jr. et al.

[11] Patent Number: 4,744,200
[45] Date of Patent: May 17, 1988

[54] THERMOPLASTIC BAG PACK WITH SINGLE TAB SUSPENSION

[75] Inventors: Gordon L. Benoit, Jr., Macedon; R. Stuart Smith, Jr., Palmyra, both of N.Y.

[73] Assignee: Mobil Oil Corporation, New York, N.Y.

[21] Appl. No.: 925,751

[22] Filed: Oct. 30, 1986

[51] Int. Cl.⁴ .................. B65D 33/14; B65B 35/50; B65B 43/04
[52] U.S. Cl. .................................. 53/447; 206/554; 383/8; 493/204
[58] Field of Search ............ 383/37, 8; 206/554, 206/526; 53/447, 384, 385, 386; 493/204

[56] References Cited

U.S. PATENT DOCUMENTS

| | | | |
|---|---|---|---|
| 3,317,037 | 5/1967 | Russell | 206/554 |
| 3,385,428 | 5/1968 | Kugler | 206/526 |
| 4,406,371 | 9/1983 | Membrino | 206/554 |
| 4,476,979 | 10/1984 | Reimann et al. | 206/554 |
| 4,529,090 | 7/1985 | Pilon | 206/554 |
| 4,557,384 | 12/1985 | Membrino | 206/554 |
| 4,560,067 | 12/1985 | Reimann | 206/554 |
| 4,562,925 | 1/1986 | Pistner | 206/554 |

FOREIGN PATENT DOCUMENTS 79465 7/1983 Australia .

*Primary Examiner*—Stephen P. Garbe
*Attorney, Agent, or Firm*—A. J. McKillop; M. G. Gilman; J. P. O'Sullivan, Sr.

[57] ABSTRACT

A bag pack of a plurality of stacked bags made from thermoplastic film, each bag comprising front and rear walls; a bottom; an open-mouth portion, said open-mouth portion being characterized by having handles which are integral extensions of said walls and located at opposite ends of said bag mouth portion. A single film tab member extends above each rear bag wall and above the open-mouth portion. The tab is coplanar with the rear wall and connected thereto through a localized line of film weakening. The tabs of all bags are in registration and are a collection of only tabs coplanar with said rear walls. The tabs are bonded together and include a suspension means to accommodate physical suspension of the pack.

1 Claim, 1 Drawing Sheet

THERMOPLASTIC BAG PACK WITH SINGLE TAB SUSPENSION

BACKGROUND OF THE INVENTION

This invention relates to a handled thermoplastic bag pack.

Thermoplastic handled grocery sacks have successfully competed with kraft paper grocery sacks and, indeed, are establishing an ever increasing share of the market. The many beneficial attributes of plastic grocery sacks are responsible for this success. Because of the nature of thin flexible thermoplastic film grocery sacks, the handleability, particularly during the bagging operation in supermarkets, leaves something to be desired.

A conventional manner of providing handled thermoplastic sacks is to arrange them in a lay-flat stack of 50, 100 or more and bond them together by way of an integral tab which extends upwardly from the bag mouth opening. This tab, in addition to providing the site at which the plurality of bags are bonded together, also constitutes the tear-off site for separation of individual bags from the bonded tabs. These bonded tabs also provide the site from which the pack of bags can be suspended from some suitable support means. For instance, a peg or flat tongue or similar suspension means may extend through an orifice in the bag tabs. U.S. Pat. No. 4,165,832 and 4,560,067, the subject matter of which are in their entirety, incorporated herein by reference, are examples of the type of thermoplastic grocery sacks and packs which form the subject of the instant invention.

While such bag pack assemblies generally function as intended during the support and dispensing of bags during a typical checkout procedure in a supermarket, for the purpose of easing congestion during checkout, any means which will assist in speeding up the checkout procedure would be an advance in this art. One cause for the slowdown in the bagging operation employing limp, thin-gauge thermoplastic film bags is the tendency of the walls of the bags and the handles of the bags to cling together. The supermarket employee is slowed down in the bagging procedure by a need to carefully separate the front from the back wall of the bag preparatory to opening the bag and positioning it properly on its bag holder so that the mouth of the bag can be opened to receive goods. Not only does the nature of the film promote film to film adherence but the fact that the bag packs have been packed close together following manufacture and during transportation contributes to the reluctance of the films to separate. In addition to this, because the front panel of each bag is connected to its suspension tab there is no place for the bagger to easily insert his fingers or hand in order to pull the front wall or panel of the bag away from the rear panel to facilitate bagging.

It is an object of the invention to present a new and novel bag pack assembly which is not subject to the shortcomings of prior art thermoplastic film bag packs.

SUMMARY OF THE INVENTION

The bag pack of the present invention comprises a plurality of stacked bags made from thermoplastic film, each bag comprising front and rear walls; a bottom; an open mouth portion, said open mouth portion being characterized by having handles which are integral extensions of said walls, said handles being located at opposite ends of said mouth portion; a single film tab member extending above each rear bag wall and above said open mouth portion, said tab being coplanar with said rear wall and connected thereto through a localized line of film weakening; the tabs of all bags being in registration and being a collection of only tabs coplanar with said rear walls, at least one suspension means in association with said tabs to accommodate physical suspension of said pack; and bonding means in association with said tabs to fasten all of said bag structures together.

DETAILED DESCRIPTION OF THE INVENTION

The bag packs of the present invention are constructed so as to be best suspended and dispensed from a bag pack holder and dispenser situated near the checkout counter of a supermarket. A representative bag pack holder and dispenser is that described in U.S. Pat. No. 4,062,170, the disclosure of which is in its entirety incorporated herein by reference. It is to be understood that other equivalent holder dispensers may be employed with the pack of the present invention. A structural common denominator of these holder dispensers is the fact that they are designed to support the entire pack of bags which may contain as many as 100 to 150 lay flat thermoplastic film bags of the type described herein. They are also designed so as to hold open and suspend the double film loop handles of the bag to accommodate the loading of the bag. The bag pack of the present invention will be described with the understanding that it can best be utilized with this type of bag pack holder dispenser but with the additional feature that individual bags will be held at three points and, thus, better facilitate loading.

Figure 1:
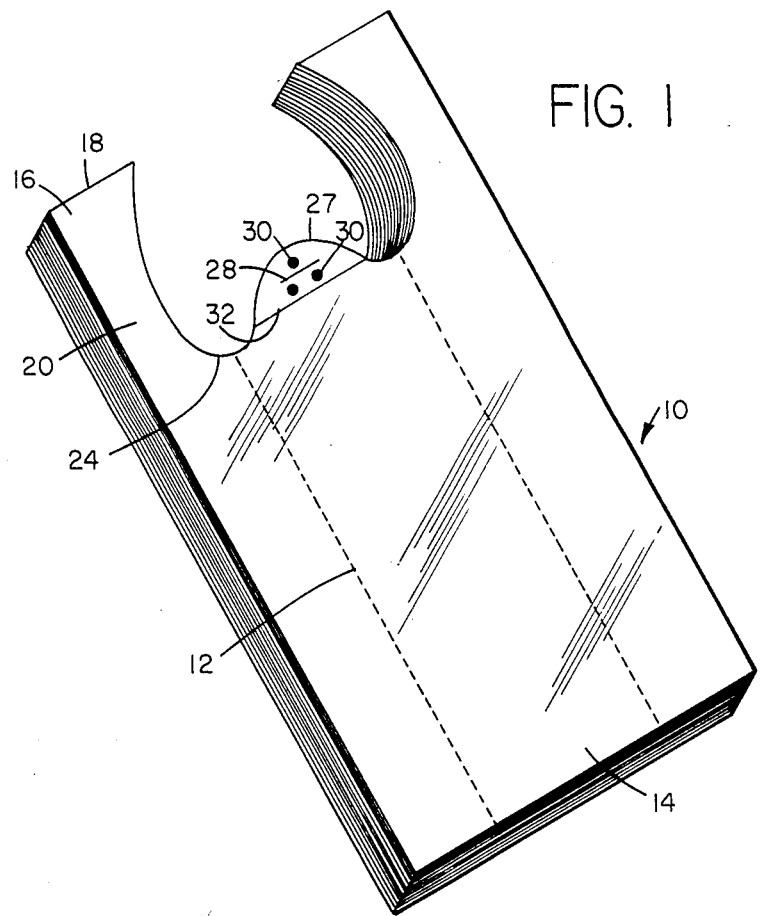
FIG. 1 is a perspective view of a stack of bags of one form of the bag structures of the present invention.

One form of the bag pack and bag pack structure of the present invention is shown in FIG. 1 of the accompanying drawing and it generally comprises a pack of handled bags 10. The individual bags are formed from a flattened, side-gusseted thermoplastic tube. The thermoplastic tube can be conveniently made of any thermoplastic film or blends of the same. Typical materials include the polyolefins, e.g., polyethylene, polypropylene, copolymers of ethylene and any other alpha olefin, etc. As indicated, the bags are side-gusseted as shown at 12 so as to provide a width dimension to the bags. It is to be understood however, that the bags need not be side gusseted but may have some other form, for example, a bottom gusset arrangement. The side gusset 12 represents a re-entrance or infolding of part of a flattend tube in a manner well known to those skilled in the art. The bags have a front panel 14 and a similar back panel 15 which is partially shown in FIG. 3. The individual bags have handles 16 which are integral extensions of the front and rear panels of the bag. Because the bag structure includes side gussets 12, the handles are composed of double film thicknesses. The individual bags of the bag pack shown, have handles which are wider at the top 18 than at the base 20 thereof. This is an optional but desirable feature which provides the user with more plastic film in the hand grip region in order to militate against the uncomfortable "roping" tendency when carrying a heavily loaded bag. A handle of more or less uniform dimensions is also contemplated.

The bag mouth opening will be generally defined by the top edge of the individual bag structure after it has been removed from the bag support tab 27. The illustrated bag pack shows stress relief curves 24 near opposite ends of the bag mouth opening at the base of the handles. This preferred structure permits the bag mouth opening to be stressed without causing bag mouth tearing at regions intermediate these stress relief points.

As indicated, region 27 consists of a single film tab member in association with each bag and it is from a collection of these tab members that the bag pack is suspended, e.g., from an orifice therein as shown at 28. This is of course only but one type of suspension means. It is possible that the tabs could be suspended by other means, for example, a clamp arrangement securely holding all tabs together, thus, performing the function of being a suspension means and a bonding means for the individual bags. A preferred form of bonding is shown at 30, which represents a more or less cylindrical, thermally-formed, bond extending through all of the tab members. These small areas are melt-bonded throughout the entire thickness of the stack to form a bag pack. Ultrasonic means can easily effect this bonding.

Figure 2:
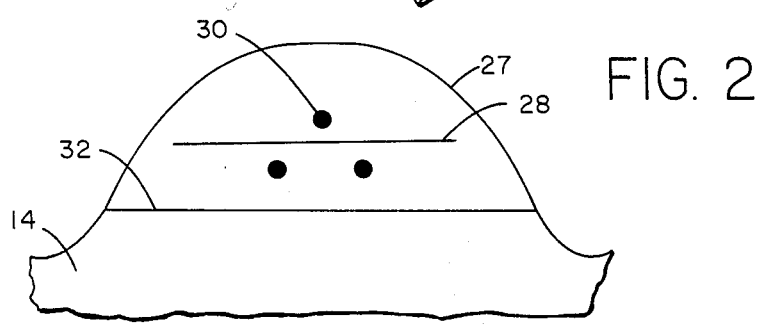
FIG. 2 is a line drawing illustrating part of the front wall at the bag mouth opening and the tab of the rear wall.
Figure 3:
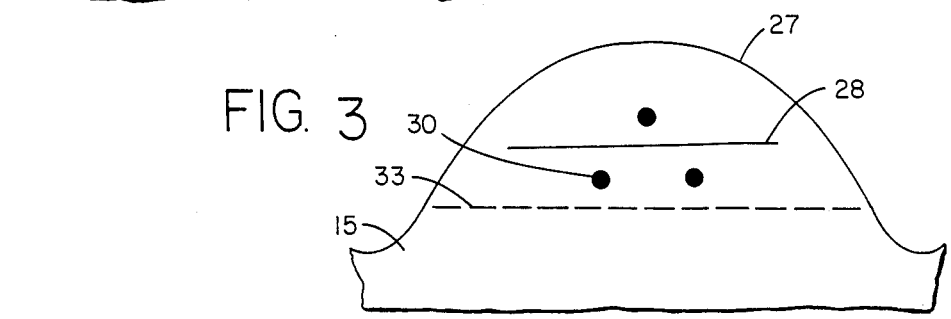
FIG. 3 is a line drawing illustrating part of the rear bag wall at the bag mouth opening and its associated rear bag tab.

Line 32 of FIG. 1 and FIG. 2 represents a line of complete severance at the bag mouth region of front wall 14. This is formed as a result of removal of a film area corresponding generally to the shape of the rear wall tab. This removal is more fully described below. This removal provides what is known as a "front side free" bag pack arrangement. This is to be distinguished from the back panel or wall 15 of each bag, as partially illustrated in FIG. 3, which is connected to tab 27 by means of a line of film weakening 33. The particular line of film weakening shown in FIG. 3 is a series of inline interrupted cuts or severances across the bottom of the tab in registration with severance line 32. Other forms of preweakening obviously can be employed, such as, a line of perforations, a line of thinning of thermoplastic film across the tab, etc.

By providing the "front side free" structure while the backside is still affixed to the tab, a considerable ease of handling aspect has been designed into the bag pack structure. With this innovation, a bag pack of the illustrated structure can be suspended in a bag pack holder dispenser such as that described in U.S. Pat. No. 4,062,170. When it is desired to load a bag, the bagger can, with a wiping motion, pass his hand and fingers down across the face of tab 27, at the upper region of the bag mouth, at severance line 32 and can, with the same motion, pull the front panel 14 of the bag away from the back panel 15 and the bag pack. This act alone solves the time consuming problem of attempting to otherwise separate front panel 14 from rear panel 15 of the bag preparatory to placing the loop handles 16 over the handle holders of the bag pack holder dispenser device. By this means, the productivity aspect of utilizing limp thermoplastic grocery sacks has been significantly increased. Bagging can be accomplished more efficiently and quicker than without this structural feature.

As indicated above, the localized line of film weakening 33 can be of any construction which will permit an individual bag to be separated preferentially along this line. The strength of this line of weakening should at least be strong enough to keep the empty bag attached to its associated tab until the beginning of the bagging operation, i.e., entry of the first items into the bag. Thus, it should stay affixed to the rear tab while the two handles are being placed over the handle support members of the bag pack holder and dispenser and after this is accomplished then it should stay attached throughout at least the beginning of bagging. It is possible that after the first few items are placed in the bag, the connection at the line of weakening may disconnect, however, at this point the first goods in the bag will tend to keep the bag open and facilate further loading of the bag. While it is difficult to accurately define the optimum strength of the film weakening at this point, it must be such as to maintain this third point of extension of the bag mouth opening at least through the beginning of the bagging operation. If the line of weakening is too strong, then there is a danger that when the loaded bag is pulled free, it may tear the back region of the bag mouth opening. Thus, the film weakening must be such as to definitely be predisposed to separate at this line only.

The orifice 28 can be of any suitable design or shape complementary to some suspension means placed within the orifice. For example, if the suspension means is a round or cylindrical peg then obviously the orifice would be circular in shape to receive the peg. A preferred suspension means is either a flat tongue-shaped member or a tongue-shaped wire-form member which is adapted to extend through a slit-like orifice in the tab as shown at 28. The dimensions of the slit orifice, which extends all the way through the plurality of stacked bag members, should tightly fit around the suspension means. Since a pack of bags of 50, 100 or 150, polyethylene film bags is quite heavy, there is sometimes a need to provide some peripheral reinforcement to the support orifice 28 so that during use it does not become distorted or enlarged. The bonding means shown in the drawings as fused regions 30, closely spaced from the orifice, contributes to the strengthening of orifice 28. These bonding means can be positioned both above and/or below the orifice in the manner described in U.S. Pat. No. 4,560,067, the disclosure of which is incorporated herein in its entirety.

The bag packs of the present invention may be prepared by any process or system which will result in the defined bag pack. One suitable technique can be described as follows:

A thermoplastic tube, for example, of a polyethylene film, is flattened and gusseted so that the gussets extend inwardly from the sides to an extent such as is shown, for example, in FIG. 1 at 12. Thereafter, the gusseted tube is sealed transversely along spaced lines which ultimately constitute the seals at the ends of the handles and at the bottom of the bag. By this technique a series of interconnected "pillowcases" is continuously formed. It is now necessary to remove an area of film from the front wall only of the "pillowcase". Thus, an area which includes an area at least coincident with the area of yet-to-be formed tab 27 is removed from front wall 14. This removal will create severance lines 32 in the bags of the completed bag packs. The area of removal from front wall 14 can be of any convenient shape so long as it is coincident with the area of tab 27 or includes the area of tab 27 but is less than the bag mouth and handle cutout area.

This can be accomplished by contacting the region of front wall 14, above tab area 27 with a suitable vacuum device which will pull front wall or panel 14 away from rear wall or panel 15. Separation of the two walls can be assured by imposing an equal or stronger vacuum on rear wall or panel 15. In this way the two opposing vacuum forces will separate the panels. The force of the vacuum on panel 14 will bring the periphery of the area to be severed into contact with a heated means, e.g., resistance wires, which will melt through the film along lines defining the periphery of the area. With this area free of front wall 14, continued force of the vacuum -will transport the severed area to a remote location for recycle. into film stock. This effectively removes the front tab from every bag and constitutes a considerable savings in polymer raw material. The bag packs are easily and effectively supported by remaining, bonded-together single tabs.

After this comparatively small area is removed from front wall or panel 14 the individual pillow cases are separated one from the other and stacked in registration for completion of the process. When the pillow cases have been stacked to, say from 100 to 125, a suitable mechanism will cut out one end of the pillow cases to simultaneously form the double film handles and the tab member of each bag. At the same time a perforating tool will pierce through tab region 27 along interrupted line 33 to create the preweakened severance line for removal of individual bags from the bag pack. Also during this cutting action or immediately thereafter, the tabs 27 are bonded together as at regions 30 and simultaneously an orifice such as that shown at 28 is formed. The bag pack can now be employed commercially.

It is to be understood that the bags described can vary in dimensions and in materials. There is nothing critical about the gauge dimension of the film employed in the bag. The bag should be capable of carrying the normal supermarket bag load which can range anywhere from a few pounds to about 35 pounds.

What is claimed is:

1. A method of forming a bag pack of thermoplastic film bags each of which has only a single suspension-bonding tab coplanar with its rear wall comprising:
    (a) providing a plurality of gusseted end-sealed tubes, each tube having a front wall, a rear wall and gusseted side walls said walls having top and bottom regions;
    (b) removing from only the top region of said front wall of each tube a region at least corresponding in area to the suspension bonding top of said rear wall;
    (c) stacking a plurality of these structures in registration;
    (d) removing from the top regions of each of said front and rear walls sufficient film to leave a bag mouth opening, only a single suspension-bonding tab coplanar with said rear wall, and a pair of double film handles located at opposite ends of said bag mouth;
    (e) bonding said tabs together;
    (f) forming in said tabs pre-weakened severance lines for removal of individual bags from said pack; and
    (g) forming a suspension orifice in said tabs.

* * * * *